Figure 1:
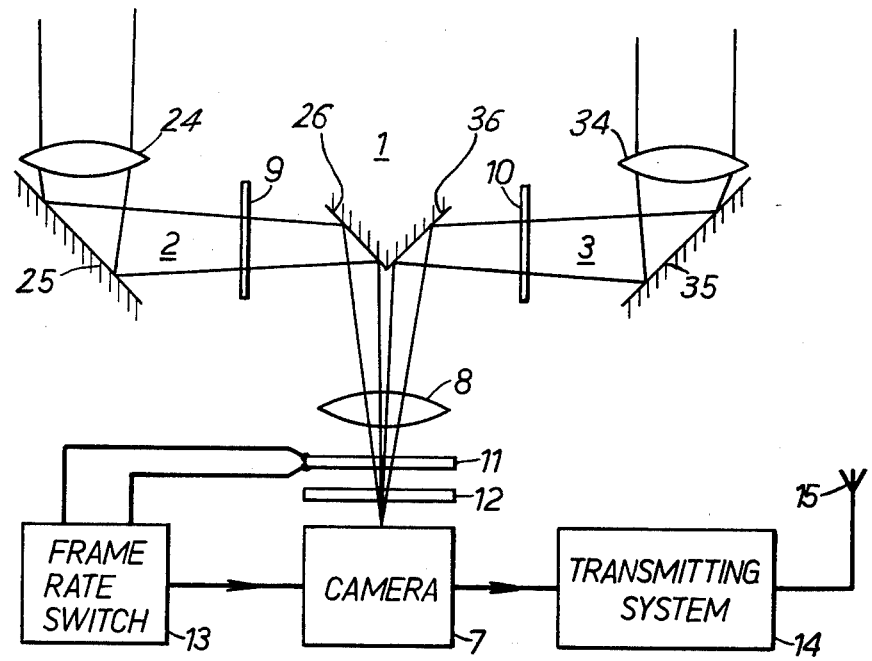

United States Patent [19]

Byatt

[11] 4,281,341
[45] Jul. 28, 1981

[54] STEREOSCOPIC TELEVISION SYSTEM

[75] Inventor: Dennis W. G. Byatt, Chelmsford, England

[73] Assignee: The Marconi Company Limited, Chelmsford, England

[21] Appl. No.: 88,059

[22] Filed: Oct. 24, 1979

[30] Foreign Application Priority Data

Nov. 9, 1978 [GB] United Kingdom ............... 43780/78

[51] Int. Cl.³ ............................................. H04N 9/54
[52] U.S. Cl. ........................................ 358/92; 350/132
[58] Field of Search ................... 358/92; 350/130, 132

[56] References Cited

U.S. PATENT DOCUMENTS

| 2,865,988 | 12/1958 | Cafarelli | 358/92 |
| 3,737,567 | 6/1973 | Kratomi | 358/92 |
| 3,821,466 | 6/1974 | Roese | 358/92 |
| 4,021,846 | 5/1977 | Roese | 358/92 |

Primary Examiner—Howard Britton
Attorney, Agent, or Firm—Spencer & Kaye

[57] ABSTRACT

A stereoscopic television system uses a switchable optical polarizer to alternately form images corresponding to the left and right eyes on a television camera tube. A corresponding switchable polarizer is used in combination with a television monitor to produce alternately images which are vertically or horizontally polarized. The switchable polarizer is a liquid crystal cell containing a thin layer of twisted nematic liquid crystal material.

3 Claims, 2 Drawing Figures

STEREOSCOPIC TELEVISION SYSTEM

This invention relates to a stereoscopic television system in which a viewer is capable of receiving a three dimensional picture from a television screen. Some television systems of this kind which have been previously proposed are not compatible with normal conventional television systems and require more than one television camera to produce the stereoscopic image prior to transmission. The present invention seeks to provide a stereoscopic television system which is relatively simple to provide.

According to this invention a television system includes a stereoscopic television transmission arrangement comprising a television camera having a switchable polariser positioned in its image receiving path and which is alternately switchable between two states of optical polarisation the switchable polariser being a liquid crystal cell containing a thin layer of liquid crystal material of the twisted nematic kind; a stereoscope containing two polarisers in mutually crossing relationship, a polariser being located in a respective one of two arms of the stereoscope; and means for projecting images obtained from both arms on to said switchable polariser whereby the camera receives images alternately from respective arms of the stereoscope.

A television receiver arranged to produce a stereoscopic picture could include a television monitor screen arranged to emit plane polarised light; and a switchable polariser positioned in front of the screen, which is alternately switchable between two states of optical polarisation the switchable polariser being a liquid crystal cell containing a thin layer of liquid crystal material of the twisted a thin layer of liquid crystal material of the twisted nematic kind.

A viewer wishing to receive a three dimensional image of the picture displayed by the television monitor would use a viewing device in which light polarised in accordance with one state of the switchable polariser is received by one eye and light polarised in accordance with the other state is received by the other eye. The switchable polariser associated with the television monitor is switched in synchronism with the operation of the switchable polariser associated with the television camera and preferably both are switched at the television frame rate. It will be appreciated that this stereoscopic television system can be used with colour television transmission, but does not need additional cameras to produce the three dimensional effect. If required, the stereoscopic signals can be produced in real time and the advantages of the system can be obtained by a viewer wearing a very simple pair of spectacles, for example, in which one eye piece contains a vertical orientated polariser and the other eye piece contains a horizontally orientated polariser. The spectacles are entirely passive and could, if necessary, be constructed wholly of very light weight plastics material.

Figure 2:
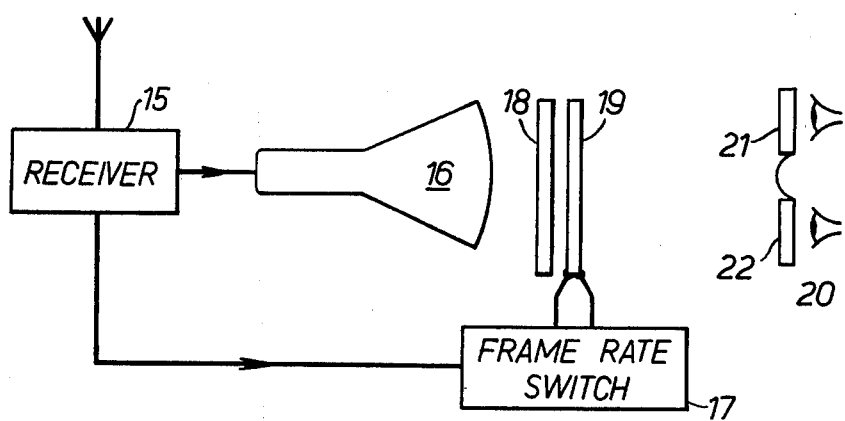

The invention is further described by way of example with reference to the accompanying drawing which illustrates a stereoscopic television system in accordance with the present invention and in which, FIG. 1 illustrates a television transmission system and FIG. 2 illustrates a television receiver.

Referring to FIG. 1, a stereoscope 1 consists of two arms 2 and 3, each arm consisting of a respective receiving lens 24 and 34 and two respective inclined mirrors 25, 26 and 35, 36. The two lenses 24 and 34 are arranged to receive light from the same object, but are spaced apart by the separation distance of human eyes. The action of the mirrors 25, 26 and 35, 36 is to produce a composite image of the two images separately received via the lenses 24, 34 and to direct the composite image on to a television camera tube 7. The image is brought to a focus at the image receiving plane of the camera 7 by means of an additional lens 8. A polariser 9 is positioned in the arm 2 of the stereoscope between the two mirrors 25 and 26. Similarly a polariser 10 is positioned in arm 3 between the corresponding mirrors 35 and 36. The two polarisers 9 and 10 are arranged to be in a mutually crossing relationship and typically polariser 9 may be vertically orientated and polariser 10 would then be horizontally orientated.

Positioned between the lens 8 and the camera 7 is a liquid crystal cell 11 and a further polariser 12, in that order. The liquid crystal cell 11 is of the kind which can be switched electrically between two discrete states of optical polarisation and in the present example the two states of optical polarisation correspond respectively to the horizontal and vertical directions. The cell contains what is known as twisted nematic liquid crystal material and the thickness of the material and the nature of electrodes positioned on either side of the material are such that plane polarised light incident on one face of the cell is rotated through 90° and emitted from the opposite face of the cell when no electric field is applied across the liquid crystal material. However, when an appropriate potential difference exists between the two electrodes which sandwich the liquid crystal material between them, the incident plane polarised light passes through the liquid crystal cell with the direction of its plane of polarisation unaltered. This is believed to be because the individual molecules of the liquid crystal material align with the applied electric field, whereas in the absence of an electric field the molecules revert to their natural orientation which is in the form of a portion of a helical spiral.

The polarisation states of the liquid crystal cell 11 are switched under the action of a frame rate switch 13 which is synchronised to the frame rate of the raster pattern of the television camera 7. Thus the camera 7 receives light via arm 2 of the stereoscope 1 on alternate frames and light from the arm 3 on the remaining frames. It is assumed that polariser 12 is vertically polarised and thus light passed by the vertical polarised polariser 9 reaches the camera 7 only when an electric field is applied to the liquid crystal cell so that the light can pass through the cell without its plane of polarisation being rotated. When the electric field is removed from the liquid crystal cell light coming from the polariser 9 is rotated through 90° at the cell 11 and since its plane of polarisation is then horizontal it cannot pass through the vertically polarised polariser 12. Under these conditions the horizontally polarised light produced by the polariser 10 does pass through the cell 11 and the polariser 12. Thus on alternate frame periods of the television system video signals corresponding to the two arms 2 and 3 of the stereoscope 1 are transmitted by a transmitting system 14 for broadcast by an antenna represented at 15.

The braodcast signals are received by the television receiving system illustrated in FIG. 2. The receiver itself is conventionally indicated at block 15 and it produces signals which generate a television picture on the surface of a television monitor 16, which is represented as a cathode ray tube. Frame rate signals are extracted from the signal received at the receiver and passed to a frame rate switch 17. A vertically polarised polariser 18 is positioned immediately in front of the monitor screen 16 and immediately in front of the polariser 18 a further liquid crystal cell 19 is mounted. This cell is similar to previously described cell 11 and it is switchable between two crossed polarisation states under the influence of the frame rate switch 17.

In order for a viewer to perceive a stereoscopic visual effect a pair of spectacles 20 are provided in which one eye piece 21 contains a horizontally orientated polariser and in which the other eye piece 22 contains a vertically orientated polariser. By arranging that the liquid crystal cell 19 transmits horizontal polarised light for alternate television frames and vertically polarised light for the other television frames, each eye sees respectively alternate frames. The frame rate switch 17 is, of course, synchronised to the switching rate of the liquid crystal cell 11 at the transmitter so that the left eye of a viewer is arranged to receive light passing through the arm 2 of the stereoscope 1 and the right eye receives light from the arm 3. If desired, the polariser 18 may be formed as an integral part of the screen of the television monitor 16 so that it is arranged to emit polarised light.

Because liquid crystal cells switch between their two polarisation states relatively slowly, it may be desirable to divide each cell into two halves, one half corresponding to the top half of a television picture and the other corresponding to the lower half, so that when the top half of the television raster pattern has been scanned the top half of the liquid crystal cell can be switched into its next required polarisation state, so that it has settled into this state by the time that the top half of the raster is required to be scanned on the next frame period. Similarly the bottom half of the liquid crystal cell would be switched, whilst the top half of the raster pattern is being scanned.

I claim:

1. A stereoscopic television system including a stereoscopic television transmission arrangement, said transmission arrangement comprising a stereoscope and a television camera, said camera having a first switchable polariser positioned in its image receiving path which is alternately switchable between two states of optical polarisation, said first switchable polariser comprising a liquid crystal cell and means for transmitting light which is of a pre-determined state of optical polarisation, said liquid cell containing a thin layer of liquid crystal material of the twisted nematic kind; and said stereoscope being comprised of two respective arms, two stereoscope polarisers in mutually crossing relationship, and means for projecting images obtained from both arms on to said first switchable polariser whereby the camera receives images alternately from the respective arms of said stereoscope, each of said stereoscope polarisers being located in a respective one of said arms of the stereoscope.

2. A stereoscopic television system as claimed in claim 1 and further including a television monitor screen arranged to emit plane polarised light; and a second switchable polariser positioned in front of the screen which is alternately switchable between two states of optical polarisation, said second switchable polariser comprising a liquid crystal cell and means for transmitting light which is of a predetermined state of optical polarisation, said liquid cell containing a thin layer of liquid crystal material of the twisted nematic kind.

3. A stereoscopic television system as claimed in claims 1 or 2 and wherein the first and second switchable polarisers are switched at the television frame rate.

* * * * *